(12) United States Patent
ter Horst

(10) Patent No.: US 8,328,896 B2
(45) Date of Patent: Dec. 11, 2012

(54) FRAME FOR FILTER PACK

(75) Inventor: Dirk ter Horst, Deerfield Beach, FL (US)

(73) Assignee: LPD Technologies, Inc., Deerfield Beach, FL (US)

( * ) Notice: Subject to any disclaimer, the term of this patent is extended or adjusted under 35 U.S.C. 154(b) by 596 days.

(21) Appl. No.: 12/282,365

(22) PCT Filed: Mar. 12, 2007

(86) PCT No.: PCT/US2007/063781
§ 371 (c)(1),
(2), (4) Date: Sep. 10, 2008

(87) PCT Pub. No.: WO2007/106767
PCT Pub. Date: Sep. 20, 2007

(65) Prior Publication Data
US 2009/0199525 A1 Aug. 13, 2009

Related U.S. Application Data

(60) Provisional application No. 60/781,129, filed on Mar. 10, 2006.

(51) Int. Cl.
*B01D 46/00* (2006.01)
(52) U.S. Cl. ............... 55/511; 55/495; 55/497; 55/499; 55/501; 55/DIG. 31
(58) Field of Classification Search .................... 55/492, 55/495, 497, 499, 500, 501, 511, DIG. 31
See application file for complete search history.

(56) References Cited

U.S. PATENT DOCUMENTS

| | | | | |
|---|---|---|---|---|
| 4,976,677 A * | 12/1990 | Siversson | ........................ | 493/413 |
| 5,603,747 A * | 2/1997 | Matuda et al. | ................... | 55/497 |
| 5,618,324 A * | 4/1997 | Sommer et al. | ................. | 55/497 |
| 5,620,505 A * | 4/1997 | Koch et al. | ........................ | 96/134 |
| 5,779,747 A * | 7/1998 | Schlor et al. | ..................... | 55/497 |
| 6,319,300 B1 | 11/2001 | Chen | | |
| 6,361,577 B1 * | 3/2002 | Unrath et al. | ................... | 55/482 |
| 6,406,509 B1 * | 6/2002 | Duffy | ............................... | 55/492 |
| 6,454,826 B2 * | 9/2002 | Fath et al. | ........................ | 55/490 |
| 6,454,827 B2 * | 9/2002 | Takagaki et al. | ................ | 55/492 |
| 6,521,011 B1 * | 2/2003 | Sundet et al. | ................... | 55/499 |
| 6,743,274 B2 * | 6/2004 | Takagaki | ......................... | 55/502 |
| 6,833,017 B2 | 12/2004 | Quigley | | |
| 6,846,342 B2 * | 1/2005 | Mertz et al. | ..................... | 55/486 |
| 6,875,250 B2 | 4/2005 | Terlson | | |
| 6,926,781 B2 * | 8/2005 | Duffy | .............................. | 156/60 |
| 7,090,713 B2 * | 8/2006 | Terlson | ............................ | 55/495 |
| 7,258,717 B2 * | 8/2007 | Duffy | .............................. | 55/497 |
| 7,435,278 B2 * | 10/2008 | Terlson | ............................ | 55/495 |
| 2003/0089090 A1 * | 5/2003 | Sundet et al. | ................... | 55/499 |
| 2003/0172633 A1 * | 9/2003 | Duffy | ............................... | 55/495 |
| 2003/0177745 A1 * | 9/2003 | Jauw | ................................ | 55/497 |
| 2004/0065066 A1 * | 4/2004 | Mertz et al. | ..................... | 55/486 |

* cited by examiner

Primary Examiner — Robert Clemente
(74) *Attorney, Agent, or Firm* — Bachman & LaPointe, P.C.

(57) ABSTRACT

A filter pack includes filter media formed into a filter structure having a front, a back and at least one side surface; and a frame adhered to the at least one side surface and comprising an adhesive and an adhesive carrier. The adhesive carrier can be a sheet of material which can be impregnated with the adhesive, one example being a sheet of the filter material itself. The adhesive carrier can alternatively be a single use tray mold for holding the adhesive while it cures, and which is left into the final product.

14 Claims, 6 Drawing Sheets

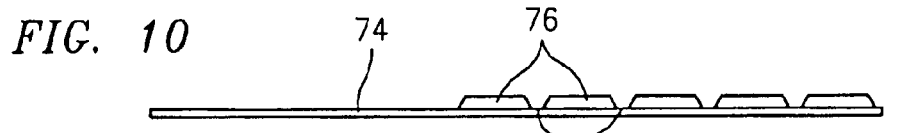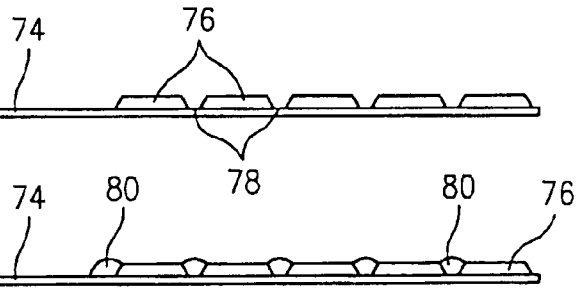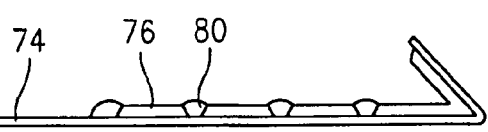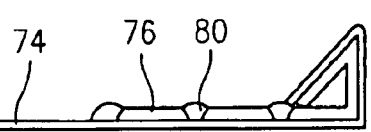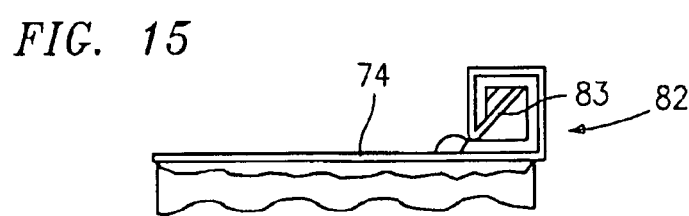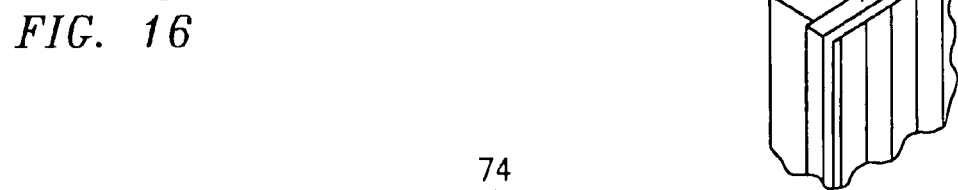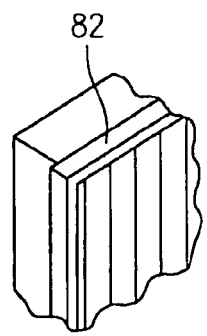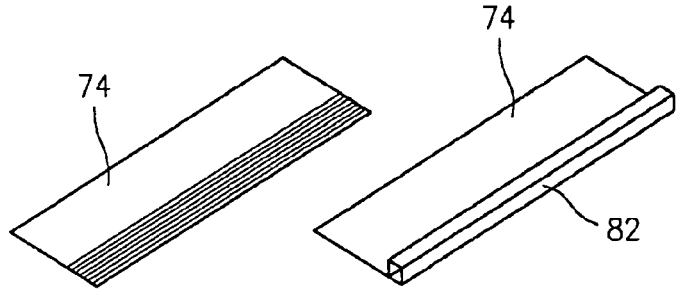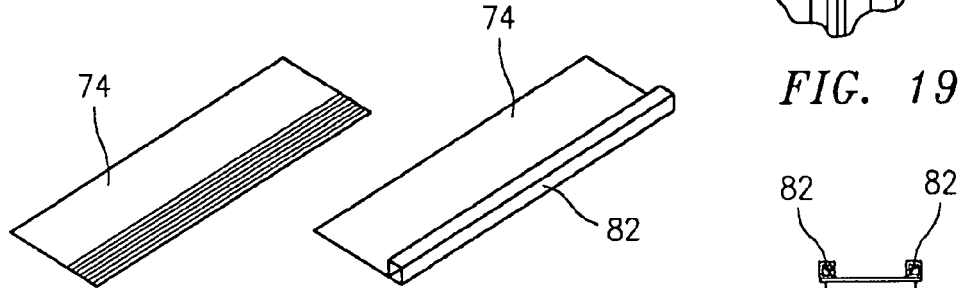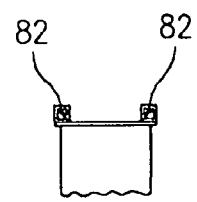

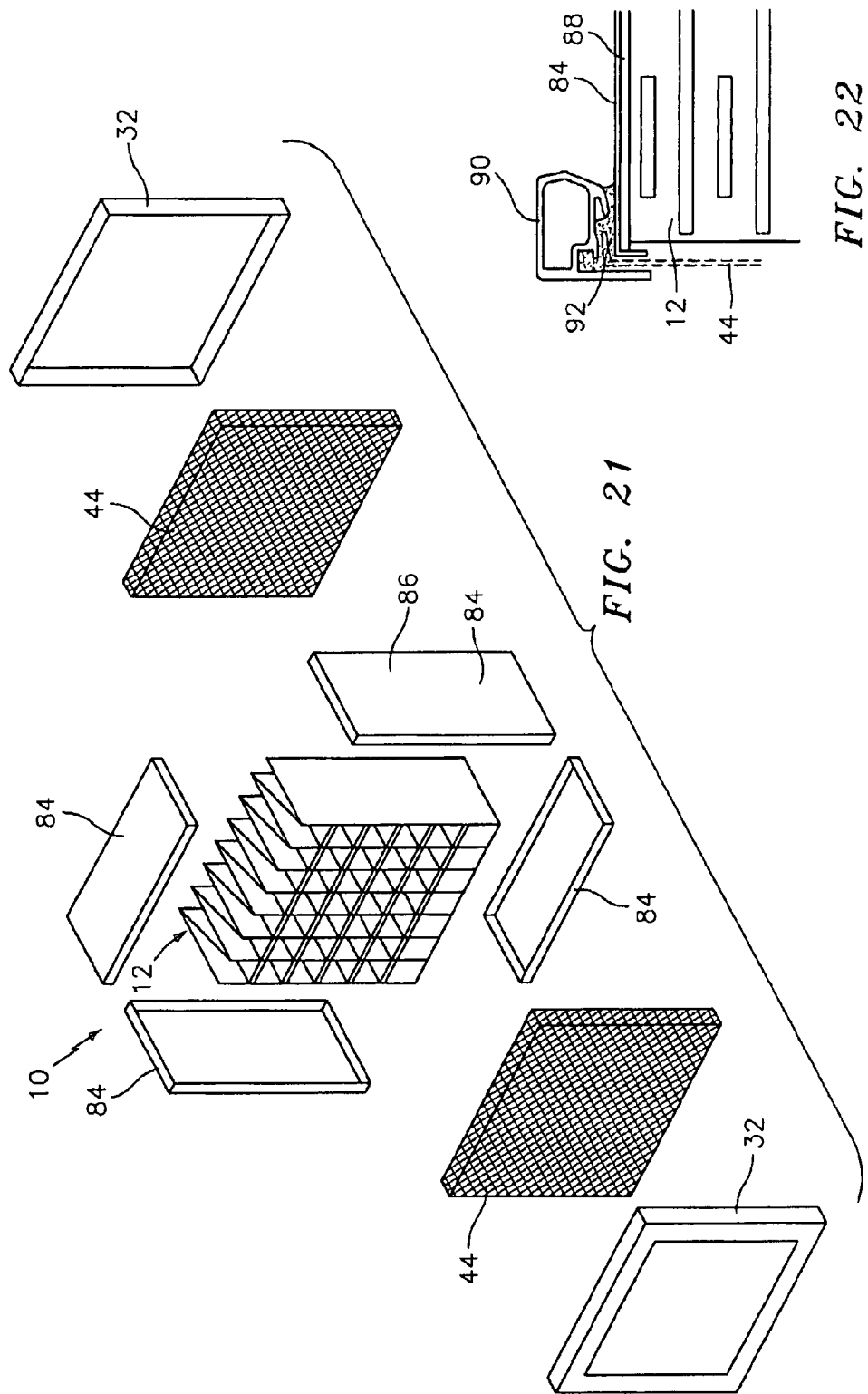

FRAME FOR FILTER PACK

CROSS-REFERENCE TO PROVISIONAL APPLICATION

This application claims the benefit of the filing date of U.S. Provisional Application No. 60/781,129, filed Mar. 10, 2006.

BACKGROUND OF THE INVENTION

The invention relates to the field of filtration and, more particularly, to a frame of a filter pack.

Filters are frequently used in air handling systems. Such filters typically include filter packs having filtration media inside some form of media support. One type of filter has the media positioned within a rigid frame of either metal, cardboard, wood or plastic. The additional material from which the frame is made, however, can be expensive. Further, making frames of metal, plastic, wood or cardboard is undesirable since such materials are materials which, above and beyond those normally needed in filter manufacture, must be kept on hand by the manufacturer.

Bag filters have filtration media sewn into bag shaped pockets which extend away from the filter header when in use. This type of filter also has disadvantages including the need for room for the bag filter to extend into, the filter bags collapsing when not in use, and the possibility of damage to the filter media when installing. Further, when a bag filter collapses during non-use and then inflates and extends during use, material which had been filtered from air handled by the filter can be shaken loose, and some of this material can re-enter air being treated.

A further disadvantage with existing framed filters is that they can be difficult to dispose of depending upon how they were used. For example, it is possible that a filter will be used to treat air which is considered contaminated. When a filter has been used in this way, disposal must be handled specially. Incineration would be one possibility, but this is precluded when the frame is a non-flammable material such as metal.

The usual filter has frames made out of cardboard, metal, plastic or wood. The use of these frame materials usually requires the filter manufacturer to work with suppliers that specialize in the named materials, in how to treat the materials, how to shape them, cut them, etc. These suppliers add another link in the economic chain which has its own technology, priorities, production cycles, profit demands, etc.

Cardboard filter frames do have a relatively low cost, but they are not water resistant. With new synthetic filter medias, the filter pack usually can last much longer than the cardboard frame; unfortunately, the filter has to be replaced because of frame failure, and using plastic or metal frames makes the filter very expensive.

Filter manufacturers usually have to have a great inventory of framing material and/or frames in order to satisfy demands of customers, and this inventory requires much space, much inventory (in very many sizes) and much personnel for inventory management and the like. For example, for metal frame filters, all different casing sizes must be kept in stock, and these include 20×20, 24×20, 16×20, 16×24, etc.

In connection with manufacture, if a filter manufacturer buys metal on a coil, that manufacturer then needs to have metal handling equipment, cutting equipment, bending equipment, rolling equipment, stamping equipment and the like. For plastic, all forming and extrusion equipment is needed. For wood, saws, dust collection and fire protection equipment are needed.

Based upon the foregoing, it is clear that the need exists for an improved frame for filter packs which addresses these various issues.

It is the primary object of the present invention to provide a solution to these issues.

Other objects and advantages of the present invention will appear herein.

SUMMARY OF THE INVENTION

In accordance with the invention, the foregoing objects and advantages have been readily attained.

According to the invention, a filter pack is provided which comprises filter media arranged in a suitable shape or configuration, and a frame for the filter media which in one embodiment preferably comprises filter material impregnated with adhesive.

Alternatively, "adhesive" material itself can be used to make the frame material within the broad scope of the present invention. Adhesive can be applied to a non-stick mold and the pack placed into the mold to produce a finished pack seal/frame without the use of media for the frame. Still further, a light weight plastic or cardboard tray can be used as a "leave in" mold which holds the adhesive while it cures and which remains part of the pack.

This frame is desirable since it can readily be made with materials on hand for the filter manufacturer in a less expensive manner. The frame of the present invention is a structural improvement over bag filters, particularly in certain environments, since the frame of the present invention provides structural rigidity and protection to the filter. Further, providing the frame from filter material results in a frame which can be completely incinerated for disposal, including the frame, which is a particular advantage over the structures of the prior art.

Different types of filters can be manufactured using the frame of the present invention. For example, the frame can be utilized with all types of pleated filter media, e.g. for box type filters, filters with headers, and the like. Further, although filter material itself is a preferred material from which to make the frame, other materials can be used as well, such as plastic film, wood veneer, and the like.

Similar material can also be used, according to the invention, to reinforce corners or other areas of a filter which could benefit from reinforcement. Further, a handle or other accessory for the filter frame can be provided by securing a strip of filter material or other accessory in proper position, for example using adhesive.

By using the method and structure of the present invention, the filter manufacturer can use the same supplier of filter media for the raw material of the filter frame (which would not be possible if applying wood, plastic or metal). Further, the manufacturer can control more of the process under his own roof which allows for much more flexibility, less inventory, less purchasing, less administration and less cost. This also allows for much quicker product development since the filter manufacturer can solve the framing requirements in-house; which could not be done with other framing materials since, for a cardboard frame, the cardboard frame supplier is needed to design the frame, produce the dies, test the manufacturing and assembly process, readjust and so on. The same is true with metal, plastic or wood frames. With the framing method of the present invention, the filter manufacturer can do everything in-house and be more competitive.

With the frame system of the present invention, the filter can be 100% synthetic, 100% burnable, relatively inexpensive, and water resistant.

With the frame of the present invention, very little material must be kept in inventory, and this material can be cut to length and width depending on what size of filter is being produced. With framing material on a roll, one can cut to length e.g. with a guillotine type cutter.

With the framing method/materials of the present invention, it is also possible to make different shapes, for example including but not limited to round, square, oval, etc., and such shapes can be made in-house with very little effort and tooling when compared with a metal, plastic or wood frame.

BRIEF DESCRIPTION OF THE DRAWINGS

A detailed description of preferred embodiments of the present invention follows, with reference to the attached drawings, wherein:

FIGS. 10-16 illustrate a step by step process of forming material for use in making a frame header according to the invention;

FIGS. 17-18 further illustrate steps of making a frame header according to the invention;

FIGS. 19 and 20 illustrate resulting frame headers according to the invention;

FIG. 21 is an exploded view of a further embodiment of the invention wherein an adhesive carrier in the form of a tray is utilized; and FIG. 22 is an enlarged illustration of a corner of the device illustrated in FIG. 21.

DETAILED DESCRIPTION

The invention relates to a frame for a filter pack which is both structurally stable and relatively inexpensive in manufacture.

Figure 3:
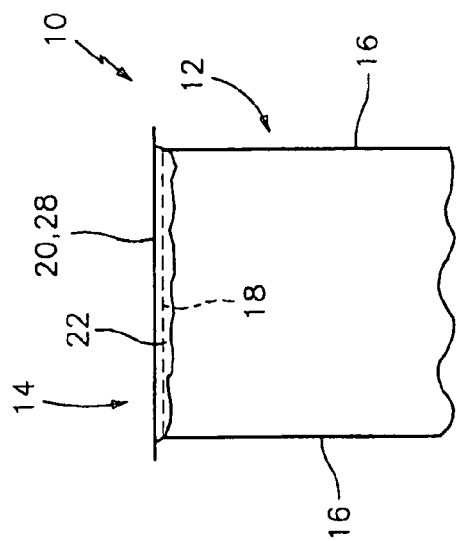
FIG. 3 is a side sectional view through a portion of the frame and media of FIG. 2.
Figure 2:
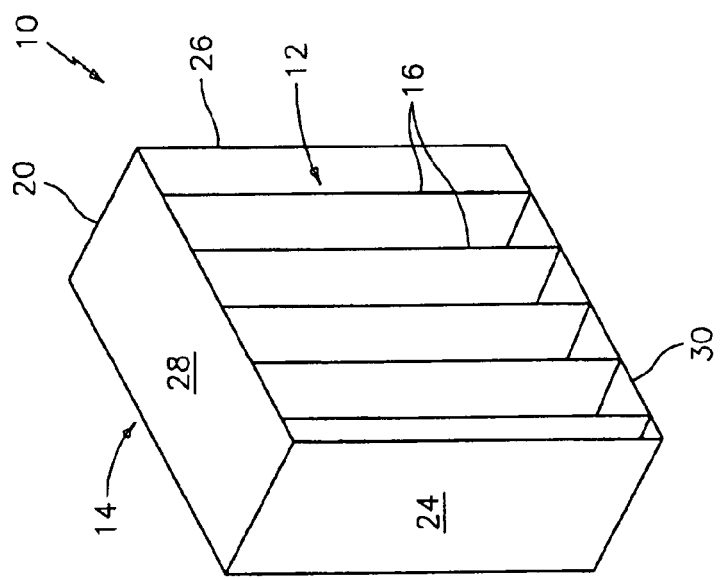
FIG. 2 illustrates filter media in a filter frame according to the invention.
Figure 1:
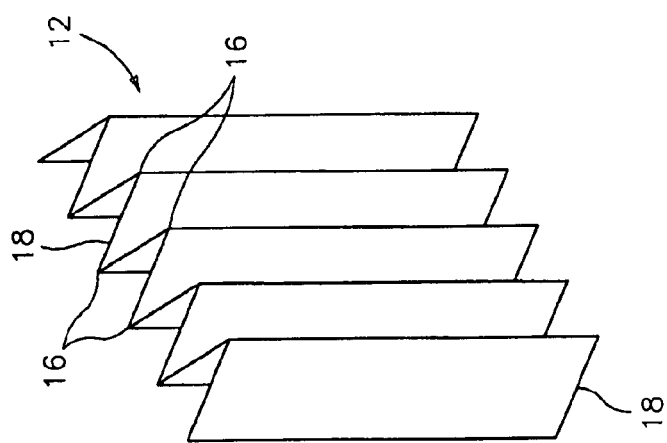
FIG. 1 illustrates a portion of filter media for a filter frame according to the invention.

FIGS. 1-3 show a filter pack 10 in accordance with one embodiment of the present invention. Filter pack 10 comprises filter media 12 which is typically a substantially flat material formed into a suitable filter structure such as the zig-zag or serpentine structure shown in FIG. 1.

In use, media 12 must be contained within some structure. As set forth above, typical structures include "bag filters" which position the media within a soft or flexible structure which is not self-supporting. An alternative is rigid frames which are typically made from sheet metal or other similar structure. As set forth above, each of these structures possesses disadvantages.

According to the invention, media 12 is positioned within a frame 14 which is provided from material that is made relatively stable to avoid the non-self-supporting structures of bag filters. However, the material from which frame 14 is made avoids the disadvantages of sheet metal frames or the like.

According to one preferred embodiment of the present invention, frame 14 is advantageously provided from the filter material itself, which can advantageously be impregnated with an adhesive which is also suitable for use in fixing the material to the edges of media 12 as desired and in order to properly seal the sides of the pack to avoid unfiltered gas or liquid bypass. FIG. 3 is a cross section taken through a portion of the pack 10 of FIG. 2, and shows one wall of media 12 defined between folds 16. At an upper edge 18 of media 12, filter framing material 20 is positioned to define frame 14 as desired. Filter framing material 20, in this embodiment, is covered or impregnated or otherwise saturated with adhesive, and adhesive 22 is used to fix filter framing material 20 relative to edge 18 as desired.

Once dried or cured, adhesive impregnated filter framing material 20 defines a substantially rigid and stable structure to support media 12 therein, and thereby avoid potential issues with bag filters, for example, due to non-self-supporting structures or unfiltered gas or liquid bypass.

It should be noted that use of filter framing material 20 to define frame 14 is a preferred embodiment due to the fact that filter framing material 20 would be readily on hand for the manufacturer of media 12, as would the adhesive 22 used to impregnate filter framing material 20 and adhere filter framing material 20 to edges 18 of media 12 as desired. Of course, other materials could suitably be utilized to define frame 14, well within the scope of the present invention. For example, this material could be provided as a plastic film, sheets of cardboard, wood veneer and the like, all within the broad scope of the present invention. Further, stick and/or peel of material on the outside of the frame is defined by the cured adhesive/sealant.

Adhesive 22 can be any suitable material which renders the filter framing material 20 substantially impermeable to air flow, and further which suitably seals the filter framing material to edges 18 of media 12 as desired. One suitable adhesive is urethane, which is a material frequently readily available to manufacturers of media 12. Of course, other types of adhesive are well within the scope of the present invention as well.

In selecting the suitable filter framing material, it should be noted that the use of a more open material allows additional urethane to permeate this material, and result in a stiffer structure. Thus, depending upon the desired rigidity of the walls of frame 14, filter framing material 20 should be selected having a suitable openness so that a desired amount of adhesive can permeate same.

It should also be noted that frame 14, although shown in FIGS. 1-3 as including four walls, does not necessarily need to cover all four walls. As made clear by the illustration of FIG. 1, media 12 itself has side walls 24, 26 which can be provided with impermeability, for example, through impregnation with adhesive, and which can thereby themselves define two side walls of the structure. Thus, the most critical walls of frame 14, in accordance with the present invention, are top and bottom walls 28, 30 (FIG. 2).

The structure of FIGS. 1-3 can be manufactured by typical procedures in connection with preparation of media 12, and in connection with frame 14, the manufacturing procedure could preferably include obtaining a sheet of suitable filter framing material 20, dipping this material into a bath of suitable adhesive 22 for a period of time sufficient to allow the adhesive to completely permeate the material, wrapping the sheet of filter framing material around the folded media 12, and then allowing the sheet of filter framing material 20 to set and dry in position so as to define frame 14.

Pack 10 as illustrated in FIG. 2 can form the basis of a filter structure for various different types of filter. For example, pack 10 can be incorporated into a frame having a header, which is typically used to mount the frame in an opening. Alternatively, pack 10 as shown in FIG. 2 can be incorporated into a structure having a "box frame" structure, with no header. Further, screens can be incorporated into the filter pack as well. These embodiments are further discussed below.

Figure 5:
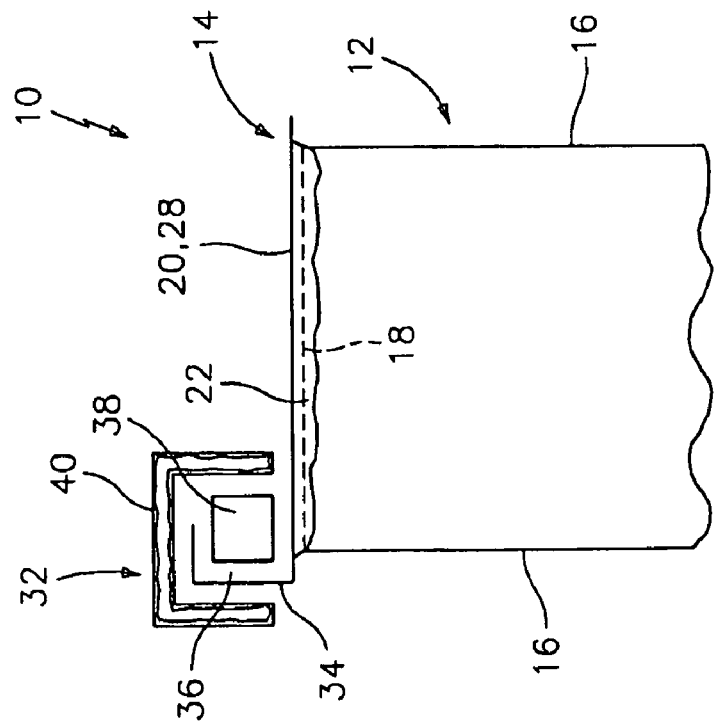
FIG. 5 is a side sectional view through a portion of the frame and media of FIG. 4.
Figure 4:
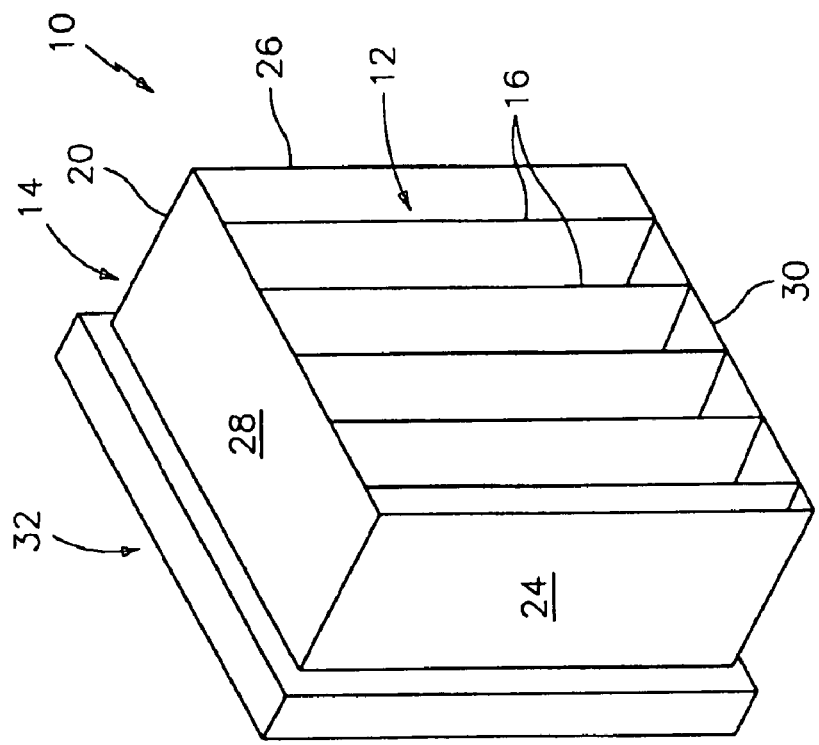
FIG. 4 shows an alternative frame according to the invention.

Turning to FIGS. 4 and 5, an embodiment is shown wherein pack 10 is incorporated into a structure having a header 32. While various known techniques can be used to attach the header to frame 14, the use of filter material in accordance with the present invention allows for a particularly advantageous approach to be taken to attach the header. In connection with this embodiment of the present invention, filter framing material 20 can be provided having an extra extension 34 or flap of material which is positioned to extend beyond the edge of the filter media 12. This flap can then be folded as desired to provide structure for a frame to be fixed to.

FIG. 5 shows this structure in further detail, and shows extension 34 being folded upwardly and then back upon itself to define an enclosed area 36 which is enclosed on three sides to allow an inner frame element 38 to be positioned within area 36. Of course, the structure of FIG. 5 is one example of an embodiment of the invention. Depending upon structural requirements, the extension may not be needed and/or the header frame may be applied directly as discussed below.

The remaining header structure 40 can then be positioned over header element 38, trapping extension 34 there between, to rigidly mount the header 32 relative to frame 14 as desired.

In connection with the embodiment of FIGS. 4 and 5, extension 34 of filter framing material can be provided either with or without embedded adhesive, depending upon whether the mounting of header 32 to this structure requires extension 34 to be flexible or rigid.

It should also be appreciated that extension 34 can be utilized to mount headers having different structures as well, all well within the scope of the present invention.

Figure 7:
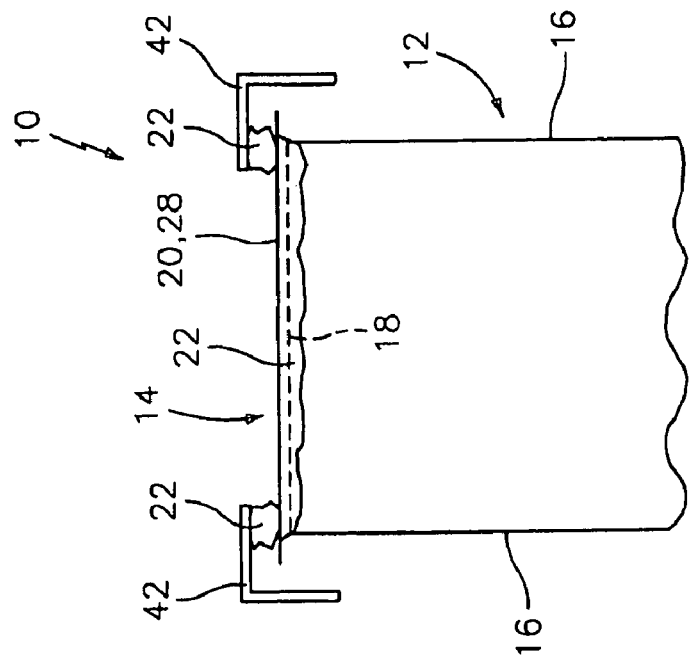
FIG. 7 is a side sectional view through a portion of the frame and media of FIG. 6.
Figure 6:
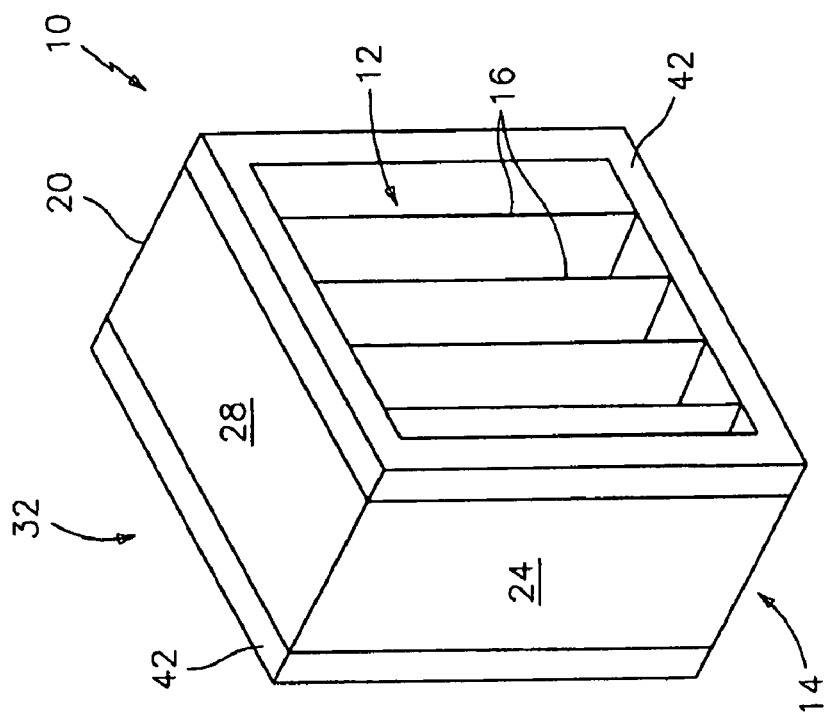
FIG. 6 shows a further alternative frame according to the invention.

FIGS. 6 and 7 illustrate a box filter including a pack 10 in accordance with the present invention. This filter has no header, and instead uses L-shaped edge members 42 which are positioned over corners of pack 10 as shown in FIGS. 6 and 7 to further support media 12 within frame 14, and further to enhance the structural rigidity of pack 10.

The L-shaped edge members 42 can advantageously be provided from the same filter framing material 20 used to define frame 14, or could alternatively be provided from some other material such as cardboard, plastic, wood veneer and the like.

Utilizing edge members 42 from the same material is one desirable alternative since this material will have excellent adhesion to the same type of material when glued or otherwise adhered to frame 14.

As best shown in the cross section of FIG. 7, L-shaped edge members 42 have two substantially flat portions arranged at substantially a 90° angle to each other, and one portion is adhered to frame 14 while the other portion extends over a portion of media 12 and can also be adhered to front and back faces of the filter pack. In this embodiment, frame 14 is defined with respect to media 12 in substantially the same manner as with the embodiments previously described.

The embodiment shown in FIGS. 6 and 7 is useful in situations where no header is needed, for example, when an entire compartment is already defined and existing for holding the filter in question.

Figure 9:
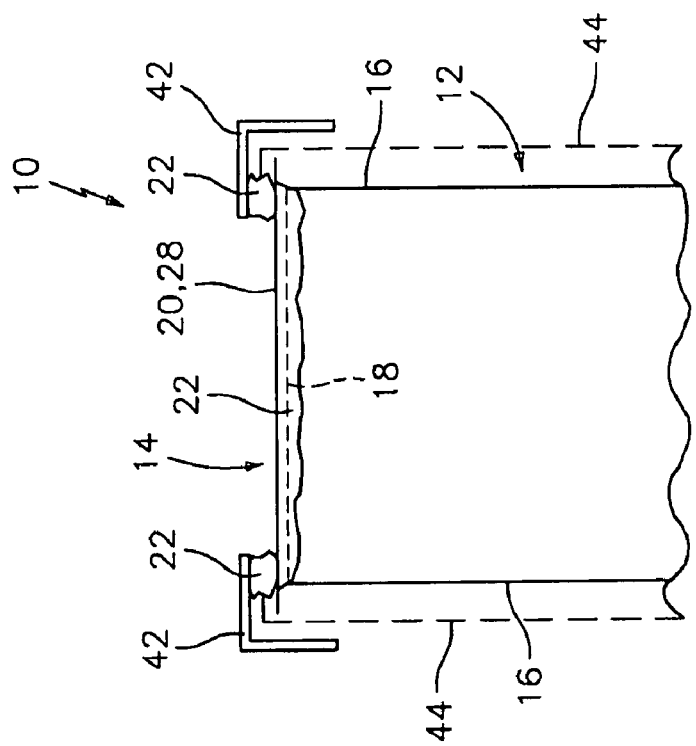
FIG. 9 is a side sectional view through a portion of the frame and media of FIG. 8.
Figure 8:
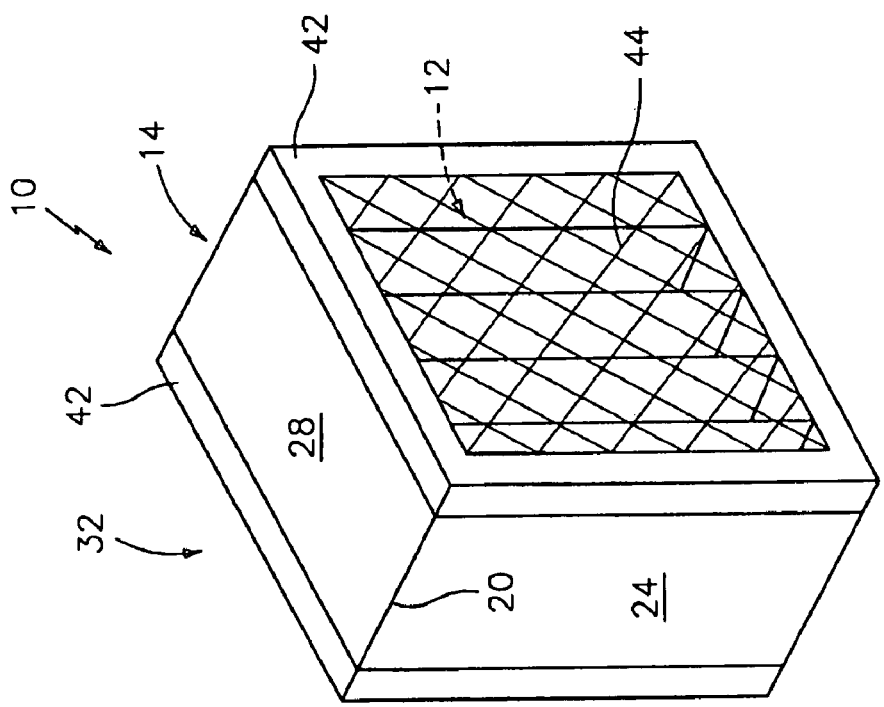
FIG. 8 shows another alternative frame according to the invention.

As mentioned above, filter structures can advantageously be provided with screens to protect the media from impact of heavy entrained objects or from the media/media packs being expelled from the frame. FIGS. 8 and 9 show the pack 10 in accordance with the present invention incorporated into such a filter structure.

As shown, in this embodiment, a box frame is utilized having L-shaped edge members 42 as described in connection with FIGS. 6 and 7. In this embodiment, however, a screen 44 is positioned over the leading and/or trailing edges of media 12 and held in place by L-shaped edge members 42.

As set forth above, one suitable example of the adhesive utilized in connection with the present invention can be a urethane glue. Any other suitable glue and all types of adhesive could also be utilized. Non-limiting examples include water soluble, hot melt, resin, organic, inorganic, etc. Further non-limiting examples of specific adhesives include epoxy, polyester and/or polyamide glues and the like.

In connection with the embodiment wherein an extension or flap is utilized to attach a header, it may be desired to saturate this extension with adhesive so that this extension also has structural rigidity which can be useful in securing pack 10 relative to header 32. In addition, and as set forth above, since frame 14 is also typically adhered to edges 18 of media 12, a bead of adhesive or glue can also typically be positioned along the filter framing material 20 of frame 14. At extension 34, it may be desirable to stop provision of the bead of glue, since there is no adhesion of this portion of the frame to the media, but nevertheless maintain saturation to provide the desired structural rigidity. Another advantage of the flap utilized in accordance with the present invention for connection to a header is that this flap, since it is flexible and can be provided of different lengths, allows the frame and the header to be adapted to different pack sizes. This is an added flexibility which is provided in accordance with the present invention.

In accordance with the present invention, it should be appreciated that the preferred embodiment, wherein filter material itself is used to define the frame and, preferably, the L-shaped edge members, a structure is provided which can be manufactured in house by the filter media manufacturer at a greatly reduced cost as compared to structures made with metal frames. In the preferred embodiment, one particular advantage is that the structures are made without the need for any cardboard.

Also as set forth above, the resulting filter pack is completely incineratable, including the frame portion itself. This helps in disposing of a used filter structure, for example, when the filter has been exposed to an environment wherein hazardous materials are possible and/or expected. In this regard, a synthetic frame according to the invention can also have appreciable caloric value.

In accordance the invention, additional filter framing material 20 can be utilized to reinforce corners of the structure, and also to provide a handle. In either of these instances, filter framing material 20 can be impregnated with adhesive if desired, and this helps to provide structural rigidity and strength in connection with the corner guards. The provision of a handle for this invention also helps to allow ease in handling of the filter structure while again avoiding the need for additional materials to be on hand for the manufacturer.

A further embodiment of the present invention is illustrated in connection with FIGS. 10-16. FIG. 10 shows a sheet 74 of media or carrier material, which can be filter material or other suitable material, as starting material to make the frame. This material can be used according to the invention to form a header for a frame. In order to prepare the material for such use, strips 76 of adhesive can be applied to material 74 as shown in FIG. 11. These strips 76 impregnate or attach to material 74 and harden. The hardened adhesive strips provide for a very stiff frame material. Adhesive strips 76 are preferably applied as substantially straight strips, and are applied leaving voids 78 between them. At these lines of no adhesive, the material 74 remains un-stiffened, and can be used as a hinge or fold line.

FIG. 12 shows a further step according to the invention wherein adhesive beads 80 are applied in voids 78 between strips 76. Before beads 80 harden, the stiff planes of material 74 are advantageously folded until the desired header shape is accomplished, for example as shown in FIGS. 13-16. While beads 80 help provide a strong header structure, an alternative embodiment of the present invention can be prepared without using beads 80, and the material can in this embodiment be folded without beads 80. In either case, the resulting header structure 82 has excellent strength. As shown in the preferred embodiment of FIG. 16, header 82 can advantageously be formed having four segments folded into a generally square or box shape with an internal diagonal support member 83. Of course, this is only one embodiment and header 82 can be formed using other fold patterns as well.

FIGS. 17 and 18 illustrate a perspective view of starting material 74 and ending structure with header 82 according to the invention, respectively, and FIG. 19 shows header 82 in a resulting filter. As shown in FIG. 20, the header 82 as formed in FIGS. 13-16 can also be formed at both ends of a filter if desired.

FIGS. 21 and 22 illustrate a further embodiment of the invention wherein the frame is defined as several adhesive carriers in which adhesive is allowed to cure to provide the structural rigidity of the frame. FIG. 21 shows filter structure 12 as in the embodiments of FIGS. 1-9. Face screens 44 are shown in position to cover the front and back surfaces of the filter structure. In this embodiment, however, instead of filter material serving as the carrier for adhesive, a plurality of trays 84 are provided. In manufacture, a tray 84 is filled with adhesive, and then filter structure 12 is set into the adhesive. The adhesive is then allowed to cure, and thereby to develop the desired structural rigidity of the frame of the filter. The tray 84 is a single use, leave in mold for the adhesive. The procedure for filling with adhesive and allowing to cure after fixing to the filter structure 12 can be repeated as many times as needed in order to position all desired trays as walls for the frame. At this stage, a header 32 or L frame can be positioned over the front and/or back edges of the filter assembly. According to this embodiment of the invention, trays 84 can suitably be a very thin cardboard or plastic, or any other structure which can hold adhesive during curing, and which can be provided at relatively low cost. One advantage of cardboard is that the outside facing surface can then suitably be printed with indicia 86 such as company name or trademarks, or product information or other advertisement. Tray 84 in this embodiment need only have enough strength to support the adhesive while it is curing. Of course, tray 84 should also be made out of material which is compatible with the adhesive being used. After cure, the adhesive becomes rigid and provides the desired structural stability to the frame. In this regard, it is preferred that at least 80% of the stiffness of the frame is accountable to the adhesive.

FIG. 22 illustrates a corner of filter assembly 10 according to the invention showing filter pack 12, a face screen 44, a tray 84 with cured adhesive 88, and a header 90 which is affixed as shown, preferably with additional adhesive 92 as shown in FIG. 22.

It should be appreciated that this description is provided in terms of preferred embodiments of the present invention. These preferred embodiments are susceptible to modification by persons of ordinary skill in the art, and are further to be taken as examples only, and not as limitations upon the broad scope of the present invention.

The invention claimed is:

1. A filter pack, comprising:
filter media formed into a filter structure having a front, a back and at least one side surface; and
a frame adhered to the at least one side surface and comprising an adhesive and an adhesive carrier, further comprising a header which comprises four contiguous portions folded to define a substantially square shape with a support within the square shape, and wherein the header comprises a filter material with adhesive beads extending along the contiguous portions.

2. The filter pack of claim 1, wherein the filter structure has four side surfaces, and wherein the frame is adhered to at least two of the four side surfaces.

3. The filter pack of claim 1, wherein the adhesive carrier comprises filter material.

4. The filter pack of claim 3, wherein the filter media and the filter material are the same material.

5. The filter pack of claim 1, wherein the adhesive carrier comprises a tray.

6. The filter pack of claim 5, wherein at least 80% of the stiffness of the frame is accountable to the adhesive.

7. The filter pack of claim 1, wherein the filter structure comprises the filter media folded in a zig-zag pattern to define the front and the back each having a series of substantially parallel fold lines, and to define the at least one side surface as a top defined by upper edges of the filter media, a bottom defined by lower edges of the filter media, and two sides defined by end walls of the filter structure, and wherein the frame is adhered at least to the top and the bottom.

8. The filter pack of claim 1, wherein the adhesive comprises urethane.

9. The filter pack of claim 1, further comprising edge members adhered to at least one corner of the filter pack.

10. The filter pack of to claim 9, further comprising at least one screen positioned over at least one of the front and the back, and wherein the edge members extend over a portion of the at least one screen to hold the at least one screen in place.

11. A filter pack, comprising:
filter media formed into a filter structure having a front, a back and at least one side surface; and
a frame adhered to the at least one side surface and comprising an adhesive and an adhesive carrier, wherein the filter structure comprises the filter media folded in a zig-zag pattern to define the front and the back each having a series of substantially parallel fold lines, and to define the at least one side surface as a top defined by upper edges of the filter media, a bottom defined by lower edges of the filter media, and two sides defined by end walls of the filter structure, wherein the frame comprises at least one tray having a floor and four side walls, wherein the floor is adhered to at least one of the top and the bottom, wherein the at least one tray comprises a top tray adhered to the top and a bottom tray adhered to the bottom, and wherein the four side walls of the top tray are not connected through another frame element to the four side walls of the bottom tray.

12. The filter pack of claim 11, further comprising a header positioned over at least one of the front and the back and adhered to the at least one tray.

13. The filter pack of claim 11, wherein the four side walls of the top tray and the bottom tray do not define walls or floor of any other tray of the filter pack.

14. A filter pack, comprising:
   filter media formed into a filter structure having a front, a back and at least one side surface; and
   a frame adhered to the at least one side surface and comprising an adhesive and an adhesive carrier, wherein the filter structure comprises the filter media folded in a zig-zag pattern to define the front and the back each having a series of substantially parallel fold lines, and to define the at least one side surface as a top defined by upper edges of the filter media, a bottom defined by lower edges of the filter media, and two sides defined by end walls of the filter structure, wherein the frame comprises at least one tray having a floor and four side walls, wherein the floor is adhered to at least one of the top and the bottom, wherein the at least one tray comprises a top tray, a bottom tray and two side trays, and wherein the floor and the four side walls of each of the top tray, the bottom tray and the two side trays are independent from each other.

* * * * *